Patented Aug. 10, 1954

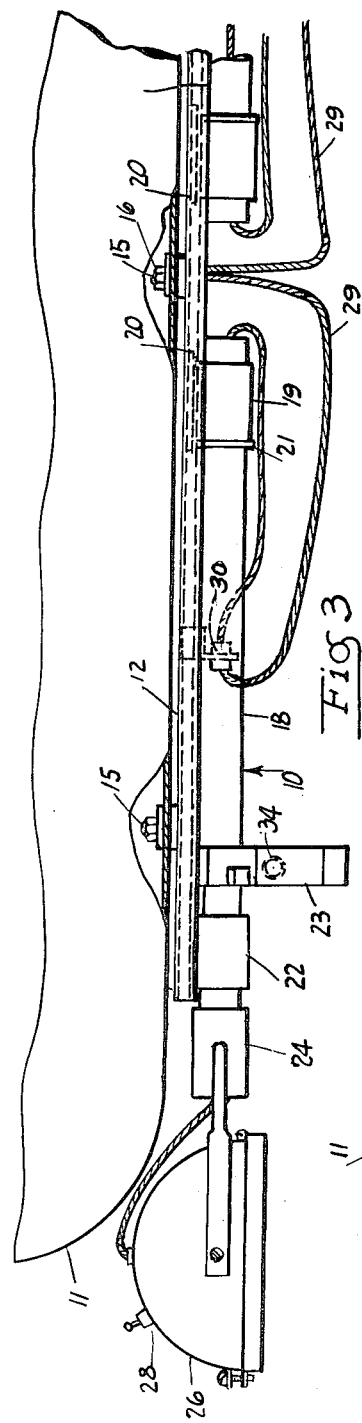
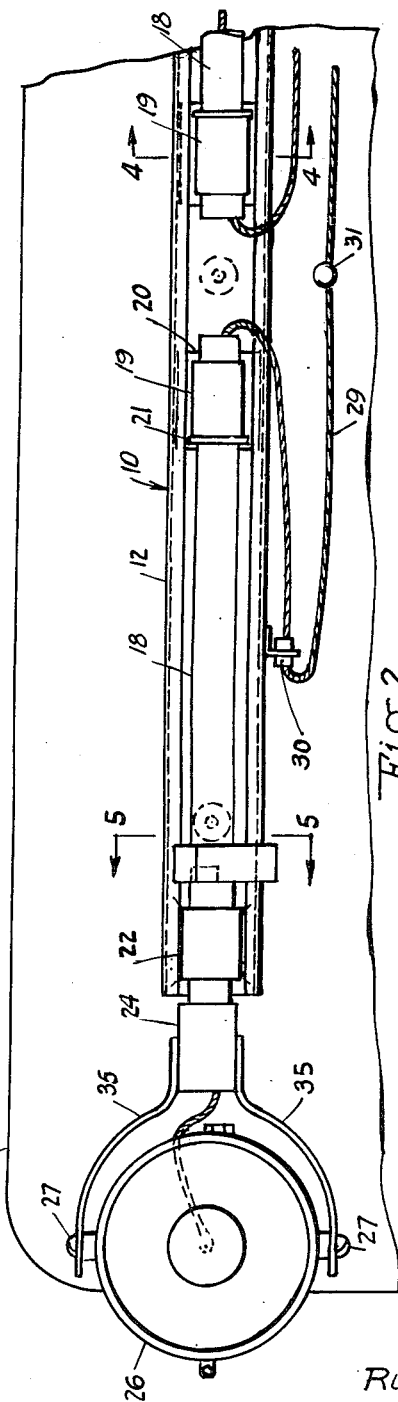
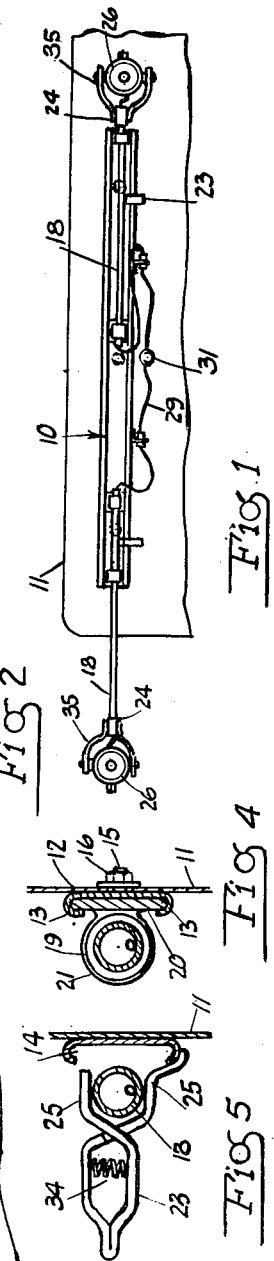

2,686,253

UNITED STATES PATENT OFFICE 2,686,253

EXTENSIBLE LIGHT FIXTURE

Rubin Denard, Miami, Fla.

Application May 31, 1952, Serial No. 290,909

1 Claim. (Cl. 240—7.1)

The present invention relates to accessories for trailer trucks and the like, and is more particularly directed to a new and improved extensible light fixture for such automotive vehicles.

At the present time an automotive vehicle, such as a trailer truck has no light or any other means of illumination affixed to the vehicle which can illuminate to the rear of the vehicle or along the front and rear sides of the truck and the trailer being towed by the truck. Also in the event the driver of the vehicle has to make emergency repairs at night on a highway, though he has highway warning lights to warn oncoming vehicles of the vehicle's presence on the highway, he has no means of illuminating the area in which he has to make such repairs, as in the replacing of a tire, other than by the use of a flash light. Also, upon backing the vehicle, the driver has to drive without having the roadway behind him illuminated.

Therefore, a principal object of the present invention is the provision of a device of the class described which can be readily secured to the rear wall of a truck cab or any suitable location, and which normally does not extend beyond the side walls of the cab, but which can be extended, when desired, to a position laterally away from the side walls of the truck, so as to permit the light rays to be directed along the front or rear sides of the truck and trailer to illuminate those parts of the automotive vehicle or the areas therebeyond.

A further object of the present invention is the provision of an extensible light fixture having the above mentioned characteristics which may be so positioned that the operator thereof can readily and conveniently manipulate and adjust the position of the light.

A still further object of the present invention is the provision of an extensible light fixture which is simple and inexpensive in construction and most effective in operation.

To the attainment of the aforesaid objects and ends, the invention further resides in those novel details of construction and operation which will be first described in detail and then specifically pointed out in the appended claim, reference being had to the accompanying drawings, in which:

Figure 1 is a front elevational view of my invention mounted on a rear wall of a trailer truck cab shown only in part.

Figure 2 is an enlarged fragmentary front elevational view of the device shown in Figure 1.

Figure 3 is a plan view of the structure shown in Figure 2.

Figure 4 is a sectional view taken through 4—4 of Figure 2.

Figure 5 is a sectional view taken through 5—5 of Figure 2.

Referring now to the drawings wherein like numerals refer to similar parts throughout the several views, the numeral 10 designates the light fixture generally which is shown mounted on a rear wall of a trailer truck cab 11 along substantially its full width, and is provided with a horizontally disposed U-shaped channel member 12 having its opposing leg portions 13, 13 turned in a direction toward each other to form a guide slot 14 along the full length of the channel member 12. On the rear or flat surface of the channel member 12 there are welded, or otherwise secured thereto, a plurality of bolts 15 which extend through bores in the rear wall of the cab 11 and on which bolts 15, nuts 16 are threaded for maintaining the bracket 10 rigidly secured to the rear wall of the cab 11.

Mounted forwardly of the channel member 12 and in spaced parallel relationship thereto is a pair of tubular members 18, each of which is approximately one-half the length of the channel member 12. At the inner end portion of each of the tubular members 18 there is a collar 19 secured thereto on whose inner portion a slide member 20 is secured, the slide member 20 being slidably mounted in the slot 14. The collar 19 is provided with a shoulder 21 whose function is to prevent the slide member 20 from being withdrawn from the slot 14, as will be explained in further detail hereinafter. At each of the outer end portions of the channel member 12, a collar 22 is welded or otherwise secured thereto. The collars 22 are each provided with a bore of proper size to permit the sliding movement of the tubular members 18 therethrough and function as a guide and support for the tubular members 18, 18. Adjacent to each of the collars 22 there is a spring clip 23, having its fingers 25, 25 normally frictionally engaging the tubular member 18 by virtue of the spring 34, the free end of the lower finger 25 being welded to the lower leg portion 13 of the channel member 12 for securing the spring clip 23 to the channel member 12.

At the free end of each of the tubular members 18 there is secured a collar 24 whose outside diameter is sufficiently large to prevent its passage through the collar 22. To each of the collars 24 are secured support members 35, 35 at whose outer end portions a spot light 26 is pivotally mounted as at 27, 27. The spot lights 26, 26 which are of conventional construction are each provided with a switch 28. Electric conduits 29, 29 each have one end connected to each of the spotlights 26 in a manner well known in the art and not shown or described herein, and extends through the full length of each of tubular members 18; then reverses its direction and passes through a grommet 30 which is secured to each of the channel members 12 at approximately one-half the distance from the center of the channel member 12 to the end portion thereof. The electric conduits 29, 29 then pass through a bore 31 in the rear wall of the cab 11 situated at approximately the center of the channel member 12 and to a source of electrical energy (not shown). The doubling back of the electric conduits 29 is for the purpose of providing slack therein so that the spotlight 26 may assume any position from their completely extended positions to their retracted positions without injuring the electric conduits 29. When the spotlight 26 is in its completely extended position, the shoulder 21 of the collar 19 will abut against the collar 22, and when the spot light 26 is in its completely retracted position, the collar 24 will abut against the collar 22. By merely gripping the spring clip 23 with sufficient pressure to release the spring pressure 34, the finger 25 is removed from frictional engagement with the tubular member 18 and the spotlight 26 can then be moved inwardly or outwardly to any desired position. Upon releasing the spring clip 23, the finger 25 then returns to its frictional engagement with the tubular member 18 and thereby maintains the member 18 and the spotlight 26 securedly in position relative to the channel member 12. Since the spotlights 26, 26 are pivotally mounted as shown, they can be rotated to any position from completely forward to rearward of the sides of the vehicle.

While the preferred form of the invention has been here disclosed, it is understood that various changes may be made in its construction by those skilled in the art without departing from the spirit of the invention as defined in the appended claim.

Having thus described my invention, what I claim and desire to secure by Letters Patent is:

An extensible light fixture comprising an elongated support plate, a pair of leg portions contained along the edge portions of said support plate, said leg portions extending at substantially right angle to said support plate, flange members contained at the free ends of said leg portions extending in a direction toward each other and terminating in spaced relation to each other thereby forming a guide retaining slot in said support plate, a slide member slidably mounted in said guide retaining slot, tubular guide means secured to said support plate at one end thereof and in axial alignment with said guide retaining slot, an elongated tubular member slidably mounted in said tubular guide means, said tubular member having one end secured to said slide member, a spring clamp having a pair of jaw members yieldingly urged in a direction toward each other, means securing one jaw member of said clamp to one of said leg portions of said support plate adjacent said tubular guide means, the other of said jaw members yieldingly engaging said tubular member, a spot light pivotally mounted on said other end of said tubular member, a grommet secured to the middle portion of said support plate, and an electric cable secured at one end to said spot light and extending through said tubular member and said grommet.

References Cited in the file of this patent

UNITED STATES PATENTS

| Number | Name | Date |
| --- | --- | --- |
| 1,403,863 | Peat | Jan. 17, 1922 |
| 1,503,638 | Cooper | Aug. 5, 1924 |